US012748037B1

(12) United States Patent
Amin et al.

(10) Patent No.: US 12,748,037 B1
(45) Date of Patent: Sep. 29, 2026

(54) WEARABLE SAMPLE TESTING ACCESSORY FOR A SMARTWATCH

(71) Applicant: Apple Inc., Cupertino, CA (US)

(72) Inventors: Ali M. Amin, Sunnyvale, CA (US); Lindsay M. Epstein, San Francisco, CA (US); Motohide Hatanaka, Menlo Park, CA (US); William K. Smith, San Francisco, CA (US); Maegan K. Spencer, Emerald Hills, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/789,487

(22) Filed: Jul. 30, 2024

Related U.S. Application Data

(60) Provisional application No. 63/541,214, filed on Sep. 28, 2023.

(51) Int. Cl.

| | |
|---|---|
| ***G01N 21/17*** | (2006.01) |
| ***G01N 21/01*** | (2006.01) |
| ***G06F 1/16*** | (2006.01) |

(52) U.S. Cl.
CPC ............. *G01N 21/17* (2013.01); *G06F 1/163* (2013.01); *G01N 2021/0112* (2013.01); *G01N 2201/0221* (2013.01)

(58) Field of Classification Search
CPC ........... G01N 21/17; G01N 2021/0112; G01N 2201/0221; G06F 1/163
See application file for complete search history.

(56) References Cited

U.S. PATENT DOCUMENTS

| | | | | |
|---|---|---|---|---|
| 10,271,738 | B2 | 4/2019 | Peeters | |
| 11,127,506 | B1 | 9/2021 | Jain et al. | |
| 2010/0216175 | A1 | 8/2010 | Melker et al. | |
| 2012/0165626 | A1 | 6/2012 | Irina et al. | |
| 2020/0195293 | A1* | 6/2020 | Leabman | H04B 1/3888 |
| 2021/0292855 | A1 | 9/2021 | Rothberg et al. | |
| 2021/0298679 | A1 | 9/2021 | Pierart | |
| 2023/0418386 | A1* | 12/2023 | Shin | G06F 1/163 |
| 2024/0164641 | A1* | 5/2024 | Jang | A61B 5/0255 |
| 2024/0345628 | A1* | 10/2024 | Yang | G06F 1/1671 |

FOREIGN PATENT DOCUMENTS

| | | |
|---|---|---|
| WO | WO2020/005027 | 1/2020 |
| WO | WO 2021/216186 | 10/2021 |
| WO | WO 2022/227999 | 3/2022 |

* cited by examiner

*Primary Examiner* — Hina F Ayub
(74) *Attorney, Agent, or Firm* — Brownstein Hyatt Farber Schreck, LLP

(57) ABSTRACT

Embodiments are directed to a measurement accessory for use with a smartwatch. The measurement accessory can include a flexible strap comprising a top surface configured to align the flexible strap with an optical sensor of the smartwatch, a bottom surface configured to align a sample patch with the optical sensor of the smartwatch, and an optical path between the top surface of the flexible strap and the bottom surface. When the smartwatch is coupled to the flexible strap the optical path is configured to allow light emitted by the smartwatch to reach the sample patch and allow light reflected from the sample patch to reach the smartwatch.

19 Claims, 7 Drawing Sheets

WEARABLE SAMPLE TESTING ACCESSORY FOR A SMARTWATCH

CROSS-REFERENCE TO RELATED APPLICATION(S)

This application is a nonprovisional patent application of and claims the benefit under 35 U.S.C. § 119(e) of U.S. Provisional Patent Application No. 63/541,214, filed Sep. 28, 2023, and titled "Wearable Sample Testing Accessory for a Smartwatch," the contents of which are incorporated herein by reference in its entirety.

FIELD

The described embodiments relate generally to accessories that utilize a wearable electronic device to perform sample tests, and more particularly, the present embodiments relate to a wearable sample testing accessory that can interface with an optical sensing system of a smartwatch.

BACKGROUND

At-home sample testing is an increasingly available option to allow users to monitor their health and wellness. For example, a test kit may be used to collect a sample (e.g., a sample such as blood, urine, hair, saliva, or sweat, food, water, or the like) for the purpose of measuring some aspect of that sample. Analysis of the sample may provide information about the sample, such as the presence and/or concentration of one or more analytes (e.g., antigens, chemicals, or the like). Typically, a collected sample either needs to be packaged and mailed to a lab or requires specialized equipment that includes all of the components necessary to analyze the sample. These devices are usually dedicated to performing a particular test and may be expensive and/or cumbersome to use.

SUMMARY

Embodiments are directed to a measurement accessory for use with a smartwatch. The measurement accessory can include a flexible strap comprising a top surface configured to align the flexible strap with an optical sensor of the smartwatch, a bottom surface configured to align a sample patch with the optical sensor of the smartwatch, and an optical path between the top surface of the flexible strap and the bottom surface. When the smartwatch is coupled to the flexible strap the optical path is configured to allow light emitted by the smartwatch to reach the sample patch and allow light reflected from the sample patch to reach the smartwatch.

Embodiments are also directed to a wearable system for performing sample measurements. The wearable system can include a smartwatch that has a housing and an optical sensing assembly positioned at least partially within the housing. The wearable system can include a sample patch configured to contact a user and a measurement accessory defining an optical path. The measurement can be positioned between the smartwatch and the sample patch when the smartwatch is worn by the user and align the optical path with the optical sensing assembly on the smartwatch when the smartwatch is worn by the user. The optical path can extend between the optical sensing assembly and the sample patch. The smartwatch can be configured to emit light towards the sample patch via the optical path, detect a portion of the emitted light returned from the sample patch via the optical path, and determine a measurement result using the light returned from the sample patch.

Embodiments further include a method for determining a measurement result using a smartwatch. The method can include determining, by the smartwatch, that a sample patch is positioned between the smartwatch and a user. In response to detecting the sample patch positioned between the smartwatch and the user, the method can include emitting first light from a first emitter of an optical sensing assembly of the smartwatch and toward a first location on the sample patch, detecting a portion of the first light returned from the first location on the sample patch, emitting second light from a second emitter of the optical sensing assembly of the smartwatch and toward a second location on the sample patch and detecting a portion of the second light returned from the second location on the sample patch. The method can include determining the measurement result based on the detected portion of the first light and the detected portion of the second light.

BRIEF DESCRIPTION OF THE DRAWINGS

The disclosure will be readily understood by the following detailed description in conjunction with the accompanying drawings, wherein like reference numerals designate like structural elements, and in which.

Figure 1:
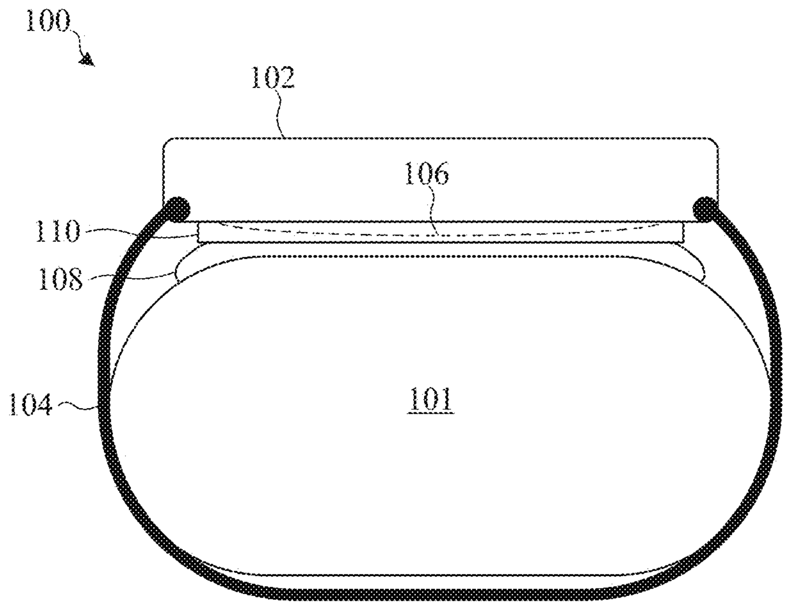
FIG. 1 shows a side view of an example wearable sample measurement system, as described herein.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications and equivalents as can be included within the spirit and scope of the described embodiments as defined by the appended claims.

Embodiments disclosed herein are directed to a measurement system that may include a smartwatch, a wearable measurement accessory and a sample patch. The wearable measurement accessory can couple to the smartwatch and align the sample patch to an optical sensing system of the smartwatch. The optical sensing system of the smartwatch can include one or more light emitters that emit light toward the sample and one or more photodetectors that receive emitted light that has interacted with the sample. The smartwatch can process the received light signals to determine a test result.

The sample patch can be placed on the skin of the user and be configured to change some property in response to detecting one or more substances at the skin of the user. For example, the sample patch may include one or more reactants that change color in response to a particular substance, exhibit a specific color based on a concentration of a substance, exhibit a color intensity based on a concentration of a subject, change color in particular location, and so. The optical sensing assembly can operate light emitters and photodetectors to determine color changes and/or other changes of the sample patch to determine a measurement result.

The wearable measurement accessory can include a flexible strap that is positioned between the user and the smartwatch when the smartwatch is worn by the user. The flexible strap can include a top surface that aligns to the smartwatch and a bottom surface that aligns to the sample patch to align the sample patch to the optical sensing system on the smartwatch. The flexible strap can also include one or more optical paths between the top surface and the bottom surface that allow light emitted from the optical sensing system to reach the sample path and allow light to return from the sample patch and to the optical sensing system.

In some cases, light emitters that are part of the optical sensing assembly on the smartwatch are used to illuminate the sample patch and the photodetectors sense light that was emitted from the light emitters and returned from the sample patch. The optical sensing system may include multiple light emitters that emit light at one or more wavelengths. One or more parameters of the emitted light may be controlled based on the type of test being performed. The wearable measurement accessory and/or smartwatch may operate differently for different types of tests. For example, a wavelength(s), intensity, duration and/or location of the emitted light may be defined by a measurement protocol that corresponds to a particular type of test. The optical sensing assembly may emit and sense light according to the parameters defined by the measurement protocol to determine a measurement result.

The wearable measurement accessory may also include one or more light sources and/or optics such as lenses, filters, mirrors, splitters and so on the direct (or otherwise modify) light emitted from the smartwatch and/or a light source incorporated into the wearable measurement accessory. The optics may also receive light from the sample patch and direct and/or modify the received light to the optical sensing assembly on the smartwatch. For examples, the optics may focus light received from a sample patch, filter the received light and so on.

In some cases, the wearable measurement accessory may define multiple optical paths that direct light to different portions of a sample patch. For example, the wearable measurement accessory may define a first optical path that directs light from a light emitter to a first location of the sample patch and a second optical path that direct light from a light emitter and to a second location of the sample patch. The first location may be associated with a control region and the second location may be associated with a test region. The smartwatch may also receive light along each of the optical paths, for example, the first optical path may direct light to a first photodetector at a first location on the optical sensing assembly and a second optical path may direct light to a second photodetector at a second location on the optical sensing assembly. The smartwatch may analyze light received along the different optical paths to determine a measurement result. In some cases, the wearable measurement accessory may isolate the different optical paths from each other.

These and other embodiments are discussed below with reference to FIGS. 1-7. However, those skilled in the art will readily appreciate that the detailed description given herein with respect to these Figures is for explanatory purposes only and should not be construed as limiting.

FIG. 1 shows an example wearable system 100 for performing sample measurements.

The wearable system 100 can include a smartwatch 102 having a band 104 that couples the smartwatch 102 to a user 101. The smartwatch 102 may include an optical sensing assembly that has a transparent window 106 (shown in phantom) positioned on a bottom side of the smartwatch 102 housing. In some cases, the transparent window 106 can extend from the surface of the smartwatch 102. For example, the transparent window 106 may include a dome shaped structure that extends towards the user 101 when the smartwatch 102 is worn by the user.

The wearable system can include a sample patch 108 that contacts the user 101 and a wearable measurement accessory 110 (which may also be referred to herein as a "measurement accessory") that is positioned between the sample patch 108 and the smartwatch 102. The wearable measurement accessory 110 can align the sample patch 108 with the optical sensing system. In some cases, the wearable measurement accessory 110 can include features that align with the transparent window 106. The wearable measurement accessory 110 can also include features that align with the sample patch 108. Accordingly, the wearable measurement accessory 110 may align the sample patch 108 and the optical sensing system in a defined orientation.

The optical sensing system can include light emitters and/or photodetectors that have a particular orientation/layout. The wearable measurement accessory 110 may position the sample patch 108 to correspond to the location of one or more of the light emitters and/or detectors. Accordingly, the wearable measurement accessory 110 may help ensure that the sample patch 108 is properly aligned to the optical sensing system of the smartwatch 102. The smartwatch 102 may operate various light emitters and photodetectors based on the defined orientation. For example, a first light emitter may correspond to a first region of the sample patch and a second light emitter may correspond to a second region of the sample patch. Measured signals from the first and second regions may be used to determine a measurement result.

In some cases, the wearable measurement accessory 110 may include features that engage with a side surface, crown, band or other features of the smartwatch 102. These features of the wearable measurement accessory 110 may cause the optical sensing system and the sample patch 108 to be positioned in a particular orientation when the smartwatch 102 is worn by a user and coupled to the measurement accessory 110.

The sample patch 108 can include one or more flexible materials and be configured to conform to a skin surface of the user 101. The measurement accessory 110 can include one or more flexible materials and be configured to conform to the sample patch 108 and/or the skin surface of the user 101. The measurement accessory 110 can function as a flexible adapter that allows alignment between the varying surface contours of the sample patch 108/user 101 and the optical sensing assembly as the smartwatch 102 is worn by a user 101.

Although FIG. 1 depicts the sample patch 108 as a separate component from the measurement accessory 110, in some cases the sample patch 108 can be integrated with the wearable measurement accessory 110. For example, the sample patch 108 can be coupled to the measurement accessory 110, the sample patch 108 and measurement accessory can be a combined in single housing, combined on a same substrate, and/or formed from a same material. In some cases, the integrated unit may be discarded after use.

Figure 2A:
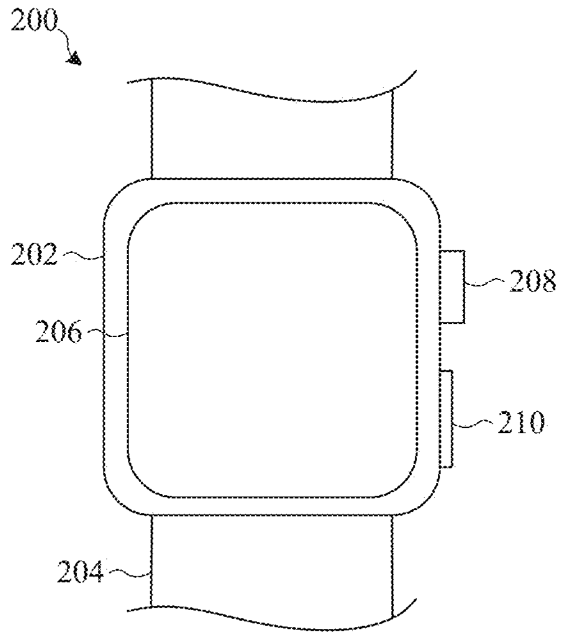
FIG. 2A shows a front view of an example electronic device that can be used to perform sample measurements, as described herein.
Figure 2B:
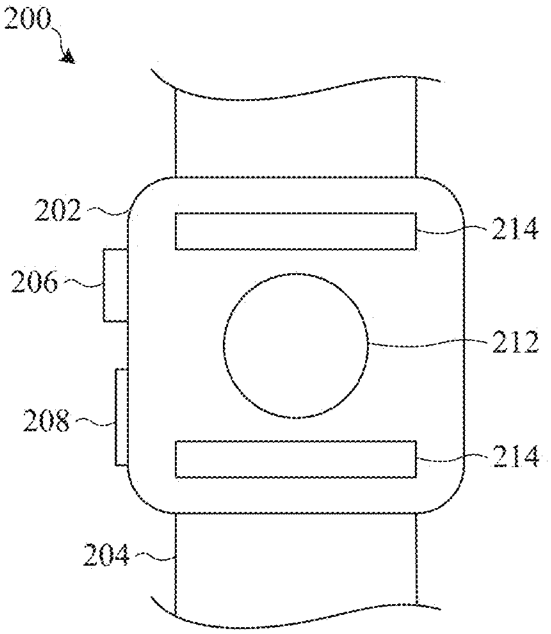
FIG. 2B shows a back view of an example electronic device that can be used to perform sample measurements, as described herein.

FIG. 2A shows a front view of an example smartwatch 200 and FIG. 2B shows a back view of the example smartwatch 200 which can be used to perform measurement test(s), as described herein. The smartwatch 200 is merely one example embodiment of an electronic device, and the concepts discussed herein may apply equally or by analogy to other electronic devices, including smart bands, mobile phones (e.g., smartphones), tablet computers, notebook computers, head-mounted displays, headphones, earbuds, digital media players (e.g., mp3 players), or the like.

The smartwatch 200 includes a housing 202 and a band 204 coupled to the housing. The housing 202 may at least partially define an internal volume in which components of the smartwatch 200 may be positioned. The housing 202 may also define one or more exterior surfaces of the device, such as all or a portion of one or more side surfaces, a rear surface, a front surface, and the like. The housing 202 may be formed of any suitable material, such as metal (e.g., aluminum, steel, titanium, or the like), ceramic, polymer, glass, or the like.

The band 204 may attach the smartwatch 200 to a user, such as to the user's arm or wrist. The smartwatch 200 may include battery charging components within the smartwatch 200, which may receive power, charge a battery of the smartwatch 200, and/or provide direct power to operate the smartwatch 200 regardless of the battery's state of charge (e.g., bypassing the battery of the smartwatch 200). In some cases, the battery charging components may include a coil such that the smartwatch my receive power wirelessly (e.g., via inductive power transfer). The smartwatch 200 may include a magnet, such as a permanent magnet, that magnetically couples to a magnet (e.g., a permanent magnet, electromagnet) or magnetic material (e.g., a ferromagnetic material such as iron, steel, or the like) in a charging dock (e.g., to facilitate wireless charging of the smartwatch 200) or other accessory device described herein.

The smartwatch 200 can include a display 206. The display 206 can be positioned at least partially within the housing 202. The display 206 may define an output region in which graphical outputs are displayed. Graphical outputs may include graphical user interfaces, user interface elements (e.g., buttons, sliders, etc.), text, lists, photographs, videos, or the like. In some cases, the display 206 may output a graphical user interface with one or more graphical objects that display information collected from or derived from one or more sensors. For example, the display 206 may output information related to a measurement test, such as a type of test, a status of the test, measurement results, and so on.

The display 206 may include or be associated with touch sensors and/or force sensors that extend along the output region of the display and which may use any suitable sensing elements and/or sensing techniques. Using touch sensors, the smartwatch 200 may detect touch inputs applied to the cover, including detecting locations of touch inputs, motions of touch inputs (e.g., the speed, direction, or other parameters a gesture applied to the cover can generate), or the like. Using force sensors, the smartwatch 200 may detect amounts or magnitudes of force associated with touch events applied to the cover. The touch and/or force sensors may detect various types of user inputs to control or modify the operation of the smartwatch 200, including taps, swipes, multiple finger inputs, single- or multiple-finger touch gestures, presses, and the like.

The smartwatch 200 may also include one or more user input devices such as a first input device 208 having a cap, crown, protruding portion, or component(s) or feature(s) positioned along a side surface of the housing 202. At least a portion of the first input device 208 (such as a crown body) may protrude from, or otherwise be located outside, the housing 202, and may define a generally circular shape or circular exterior surface. The exterior surface of the first input device 208 may be textured, knurled, grooved, or otherwise have features that may improve the tactile feel of the first input device 208 and/or facilitate rotation sensing.

The first input device 208 may facilitate a variety of potential interactions. For example, the first input device 208 may be rotated by a user (e.g., the crown may receive rotational inputs). Rotational inputs of the first input device 208 may zoom, scroll, rotate, or otherwise manipulate a user interface or other object displayed on the display 206 among other possible functions. The first input device 208 may also be translated or pressed (e.g., axially) by the user. Translational or axial inputs may select highlighted objects or icons, cause a user interface to return to a previous menu or display, or activate or deactivate functions among other possible functions.

In some cases, the smartwatch 200 may sense touch inputs or gestures applied to the first input device 208, such as a finger sliding along the body of the first input device 208 (which may occur when first input device 208 is configured to not rotate) or a finger touching the body of the first input device 208. In such cases, sliding gestures may cause operations similar to the rotational inputs, and touches on a cap or crown may cause operations similar to the translational inputs. As used herein, rotational inputs include both rotational movements of the first input device 208, as well as sliding inputs that are produced when a user slides a finger or object along the surface of a crown in a manner that resembles a rotation (e.g., where the crown is fixed and/or does not freely rotate).

The smartwatch 200 may also include other input devices, switches, buttons, or the like. For example, the smartwatch 200 includes a second input device 210, which may be a button. The second input device 210 may be a movable button or a touch-sensitive region of the housing 202. The button may control various aspects of the smartwatch 200. For example, the button may be used to select icons, items, or other objects displayed on the display 206, to activate or deactivate functions (e.g., to silence an alarm or alert), or the like.

FIG. 2B shows a rear side of the smartwatch 200. The smartwatch 200 may include one or more windows 212 (one of which is shown) that allow light to pass through a portion of the housing 202. The one or more windows 212 may be part of an optical sensing system and coupled to the housing 202. The one or more windows 212 may include light transmissive materials and be associated with internal sensor components, which may be used to determine biometric information of a user, such as heart rate, blood oxygen concentrations, and the like, as well as information such as a distance from the smartwatch to an object. The particular arrangement of the one or more window(s) 212 in the housing 202 shown in FIG. 2B is one example arrangement, and other window arrangements (including different numbers, sizes, shapes, and/or positions of the windows) are also contemplated. As described herein, the window arrangement may be defined by or otherwise correspond to the arrangement of components in the integrated sensor package.

The housing 202 may also include one or more electrodes 214. The electrodes 214 may facilitate input to biometric sensing circuitry or other sensing circuitry within the smartwatch 200. The electrodes 214 may be a conductive surface that is conductively coupled, via one or more components of the smartwatch 200, to the biometric sensing circuitry. In some cases, one or more input devices (e.g., the first input device 208 and/or the second input device 210) may be operated as an electrode that is used to apply electrical signals to a user and/or sense electrical signal from a user. The input devices may be conductively coupled to sensing circuitry within the housing 202.

Figure 3:
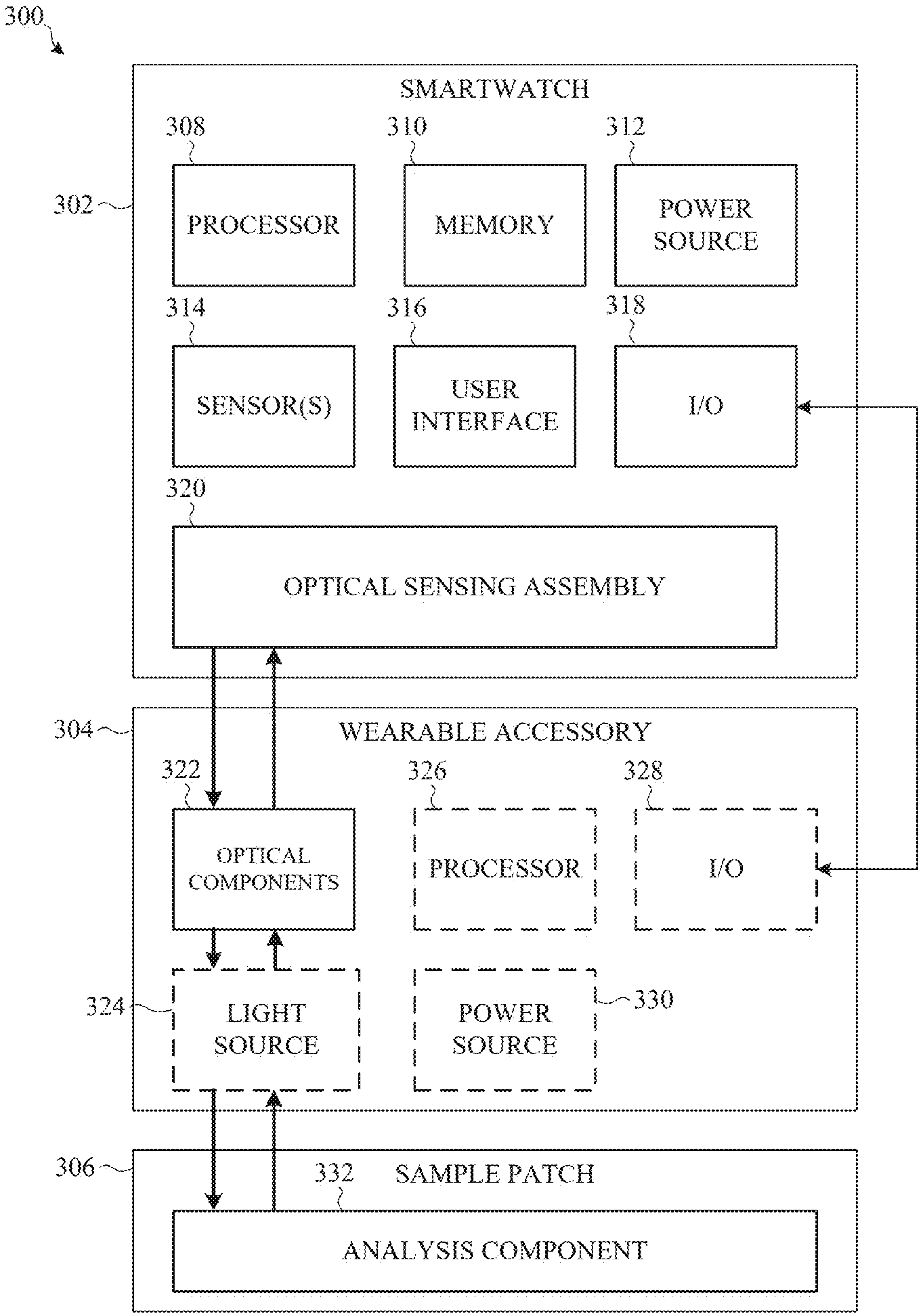
FIG. 3 shows a block diagram of an example wearable measurement system, as described herein.

FIG. 3 shows an example block diagram block diagram of an example wearable measurement system 300, as described herein. The wearable measurement system 300 can include a smartwatch 302, a wearable measurement accessory 304 and a sample patch 306, which can be examples of the smartwatches, wearable measurement accessories and sample patches described herein. The wearable measurement system 300 can be used to perform measurement tests as described herein.

The smartwatch 302 can include a processor 308, memory 310, a power source 312, one or more sensors 314, a user interface 316, an input/output (I/O) mechanism 318, and an optical sensing assembly 320. The smartwatch 302 can be an example of the smartwatches described herein (e.g., smartwatch 200 and include components described with respect to the smartwatch 200).

The processor 308 can control some or all of the operations of the smartwatch 302. The processor 308 can communicate, either directly or indirectly, with some or all of the components of the smartwatch. For example, a system bus or other communication mechanism can provide communication between, the processor 308, the memory 310, the power source 312, the one or more sensors 314, the user interface 316, the input/output (I/O) mechanism 318, and the optical sensing assembly 320.

The processor 308 can be implemented as any electronic device capable of processing, receiving, or transmitting data or instructions. For example, the processor 308 can be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitable computing element or elements.

It should be noted that the components of the smartwatch 302 can be controlled by multiple processors. For example, select components of the smartwatch 302 (e.g., a sensor 314) may be controlled by a first processor and other components of the smartwatch 302 (e.g., the I/O 318) may be controlled by a second processor, where the first and second processors may or may not be in communication with each other.

The memory 310 can store electronic data that can be used by the electronic device. For example, the memory 310 can store electrical data or content such as, for example, measured electrical signals, audio and video files, documents and applications, device settings and user preferences, timing signals, control signals, and data structures or databases. The memory 310 can be configured as any type of memory. By way of example only, the memory 310 can be implemented as random access memory, read-only memory, Flash memory, removable memory, other types of memory storage elements, or combinations of such devices.

The power source 312 can be implemented with any device capable of providing energy to the smartwatch 302. For example, the power source 312 may be one or more batteries or rechargeable batteries.

The smartwatch 302 may also include one or more sensors 314 in addition to the optical sensing assembly which may provide additional functionality to the smartwatch 302. The sensor(s) 314 can be configured to sense one or more type of parameters, such as but not limited to, electrical signals, pressure, sound, light, touch, heat, movement, relative motion, biometric data (e.g., physiological parameters), and so on. For example, the sensor(s) 204 may include, one or more electrodes (and corresponding circuitry), a pressure sensor, an auditory sensor, a heat sensor, a position sensor, a light or optical sensor, an accelerometer, a pressure transducer, a gyroscope, a magnetometer, a health monitoring sensor, and so on. Additionally, the one or more sensors 314 can utilize any suitable sensing technology, including, but not limited to, capacitive, ultrasonic, resistive, optical, ultrasound, piezoelectric, and thermal sensing technology.

In some cases, the smartwatch 302 may be configured to measure electrical properties of a sample using the electrodes. For example, the wearable measurement accessory 304 may include conductive materials that transmit electrical signals to and from the electrodes on the smartwatch 302. In other cases, the housing of the measurement accessory 304 may include openings that allow electrodes on the smartwatch 302 to contact the sample carrier 306 and/or a sample on the sample carrier 306.

The smartwatch 302 may also include a display 316, which may be an example of the display 206. The display 316 may include a display which may be implemented as a liquid-crystal display (LCD), organic light-emitting diode (OLED) display, light-emitting diode (LED) display, or the like. If the display is an LCD, the display may also include a backlight component that can be controlled to provide variable levels of display brightness. If the display is an OLED or LED type display, the brightness of the display 316 may be controlled by modifying the electrical signals that are provided to display elements. The display 316 may correspond to any of the displays shown or described herein.

The I/O mechanism 318 can transmit and/or receive data from a user or another electronic device. An I/O mechanism 318 can include a display, a touch sensing input surface, one or more buttons (e.g., a graphical user interface "home" button), one or more cameras, one or more microphones or speakers, one or more ports, such as a microphone port, and/or a keyboard. Additionally or alternatively, an I/O device 318 or port can transmit electronic signals via a communications network, such as a wireless and/or wired network connection. Examples of wireless and wired network connections include, but are not limited to, NFC, RF, cellular, Wi-Fi, Bluetooth, IR, and Ethernet connections.

The optical sensing assembly 320 may include a cover that has a dome shaped exterior surface, one or more light emitters configured to emit light through the cover, and one or more photodetectors configured to receive light through the cover. Each light emitter can emit light at a corresponding wavelength. The optical sensing assembly 320 may include multiple light emitters that emit light at a particular wavelength and/or may include multiple light emitters that each emit light at a different corresponding wavelength. In some cases, one or more light emitters may be configured to emit light within a particular range, which may include wavelengths ranging from 620 nm to 1 mm; in green wavelength range, which may include wavelengths ranging from 495 nm to 570 nm; and/or in any other visible and/or near-visible wavelength ranges. Certain light emitters may emit multiple different wavelengths (or wavelength ranges) simultaneously or may be tunable to vary the emitted wavelength.

The photodetectors can be configured to measure light intensity of light emitted by one or more light emitters and/or light emitted from other components such as a light source contained in the measurement accessory 304.

In some cases, the optical sensing assembly 320 can include multiple light emitters positioned at different locations of the sensing assembly. For example, an IR/Red light emitter and a green light emitter may be positioned at each of a first location and a second location. Accordingly, the optical sensing assembly may be able to emit the same wavelength of light from different locations. Additionally or alternatively, photodetectors can be positioned at different locations of the sensing assembly. In some cases, the different light emitters and/or photodetectors can be separated by one or more features (e.g., internal walls), which optically isolate light emitters and/or photodetectors from each other.

In some cases, the optical components can include films or other surface features that are applied to the transparent cover and may be position on an internal surface of the cover, an external surface of the cover, or within a thickness of the cover. The films or other surface features can be configured to block, filter, focus or otherwise modify light emitted from and/or received by the optical sensing assembly 320.

The wearable measurement accessory 304 can include one or more optical components 322 that direct or otherwise modify light that is transmitted to or from the sample patch 306. In some cases, the optical component(s) 322 can include one or more optical paths defined by the wearable measurement accessory 304 and that allow light to travel between the optical sensing assembly 320 and the sample patch 306. Additionally or alternatively, the optical components 322 can include optical filters, mirrors, lenses, splitters and/or other components the direct (or otherwise modify) light transmitted to and/or from the sample patch 306. For example, the optical components 322 can include a lens that is positioned between the smartwatch and the sample patch 306 and focuses light received from the sample patch 306 on one or more a photodetectors of the optical sensing assembly. Additionally or alternatively, the lens or additional lens incorporated included in the optical components 322 can focus light from one or more light emitters and onto the sample patch 306.

In some cases, the wearable measurement accessory 304 can include one or more light sources 324, which can emit light towards the sample patch 306 and be received by the optical sensing assembly 320. The light source(s) 324 can be a broadband light source, a narrow band light source, mono chromatic light source and/or any other suitable light source. In some cases, the light source 324 may emit light across a range of visual wavelength and/or include IR light and ultraviolet light. The light source 324 may include multiple light emitters that emit the same wavelength(s) of light and/or different wavelengths of light.

In some cases, the wearable measurement accessory 304 may include a processor 326, which can control operations of components (e.g., the light source 324, I/O 328, and/or the power source 330) of the wearable measurement accessory 304. The processor 326 can be implemented as any electronic device capable of processing, receiving, or transmitting data or instructions. For example, the processor 326 can be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitable computing element or elements.

The wearable measurement accessory 304 can include I/O mechanism 328 that can transmit and/or receive data from a user or another electronic device. The I/O device 328 or port can transmit electronic signals via a communications network, such as a wireless and/or wired network connection. Examples of wireless and wired network connections include, but are not limited to, cellular, Wi-Fi, Bluetooth, IR, NFC, RF and Ethernet connections.

The wearable measurement accessory 304 can also include a power source 330 can be implemented with any device capable of providing energy to the measurement accessory 304 and/or the smartwatch 302. For example, the power source 330 may be one or more batteries or rechargeable batteries. Additionally or alternatively, the power source 330 can be a power connector or power cord that connects the measurement accessory 304 to another power source, such as a wall outlet. The power source 330 may provide power to one or more components on the measurement accessory (e.g., light source 324, processor 326, I/O 238, and so on).

In some cases, the measurement accessory may include conductive contacts that contact the sample patch 306, when the sample patch 306 is coupled to the measurement accessory 304 and can transmit electrical signals to the sample patch 306.

The sample patch 306 can include an analysis component 332. The analysis component 332 can be configured to contact a user, sample biological material, and provide an output in response to the sample. In some cases, the analysis component may include substrates, reactants or other materials that are positioned as specific regions on the sample patch 306 and change an optical property in response to the sample.

In some cases, the analysis component 332 can contain reactants positioned at one or more regions of the sample patch 306 and that change based on a condition of the sample. For example, the analysis component 332 can include a reactant that reacts with a bodily fluid (e.g., sweat, blood, interstitial fluid, and so on) and presents a color and/or color intensity based on a concentration of an analyte in the sample. The color, intensity may be detected by the optical sensing assembly to determine a measurement result. In some cases, the analysis component 332 can include a fluorescent reactant that is excited using a narrow band light source and reacted fluorescent material can emit light that can be detected by the optical sensing assembly.

In some embodiments, the analysis component 332 can include gradient based reactants that provide a color gradient based on a type, concentration and/or other parameter of an analyte. For example, the reactant may generate a color gradient over a distance and the change in color and/or distance/length of the color change may be used to determine a result, such as presence and/or a concentration of a substance.

In other embodiments, the analysis component 332 can include a microfluidic device. The microfluidic device can transport, mix, separate or otherwise process the sample, and the optical sensing assembly 320 can detect light at one or more regions on the microfluidic device to analyze one or more processes performed by the microfluidic device. In further embodiments, the analysis component 332 can include electro-chemistry components, which may be used to the analyze a sample.

In some embodiments, the analysis component 332 may include one or more structures that can be inserted into/through the skin of the user to sample biological substances such as interstitial fluid, blood and so on. These structures may include microneedles, filaments (e.g., a reactive filament) and/or the like.

In other embodiments, the analysis component 332 may include electrochemistry system(s), which may receive electrical signals from the wearable measurement accessory, electrodes on the smartwatch 302 (e.g., electrodes 214), and/or other suitable source. Electrochemistry components may be used to the analyze one or more electrical properties of a sample, such as an electrical change (e.g., change in resistance) of the sample, the analysis components 332 or other portions of the sample carrier 306. The analysis component 332 may include electrochemistry system(s), which may receive electrical signals from the measurement accessory, electrodes on the smartwatch 302 (e.g., electrodes 214), and/or other suitable source.

Figure 4A:
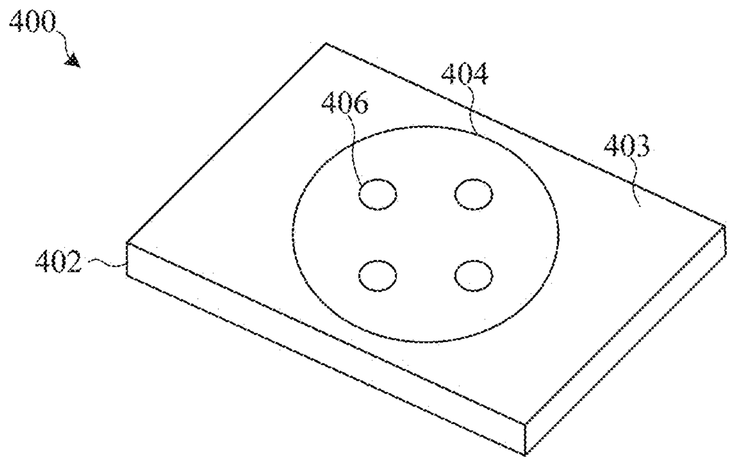
FIG. 4A shows a top-side perspective view of a wearable measurement accessory, as described herein.

FIG. 4A shows a top-side perspective view of a wearable measurement accessory 400, as described herein. The wearable measurement accessory 400 can be formed from a flexible material. The flexible material can be configured to conform to a sample patch and/or skin surface of the user when positioned between the smartwatch and a user as described herein.

The wearable measurement accessory 400 can include a top surface 403 that defines one or more first alignment features 404 that align the wearable measurement accessory 400 to a smartwatch. The first alignment features 404 may include dome structures formed in the top surface 403 that corresponds to structures on an optical sensing assembly. For example, the optical sensing assembly may include a transparent window having an outer surface that forms a dome structure that extends from the housing of the smartwatch. The first alignment features 404 may define a dome shaped recess that correspond to the outer surface of the transparent window on the optical sensing assembly. Accordingly, when the first alignment features 404 may be used to position the wearable measurement accessory 400 in a defined relationship to the optical sensing assembly.

Additionally or alternatively, the wearable measurement accessory 400 can include additional alignment features that engage with/contact other portions of the smartwatch such as a back surface, sides surfaces, front surface, crown, button, to align the measurement accessory 400 to the smartwatch in a defined relation.

The measurement accessory 400 can include one or more optical paths 406 (one of which is labeled), which allow light emitted from the optical sensing assembly to be transmitted to a sample patch and allow light returned from the sample patch to reach the optical sensing assembly. The optical paths 406 may define channels to specific locations on the smart patch, as described herein. Additionally or alternatively, the optical paths 406 may include optical components such as lens, filters and so on, as described herein.

Figure 4B:
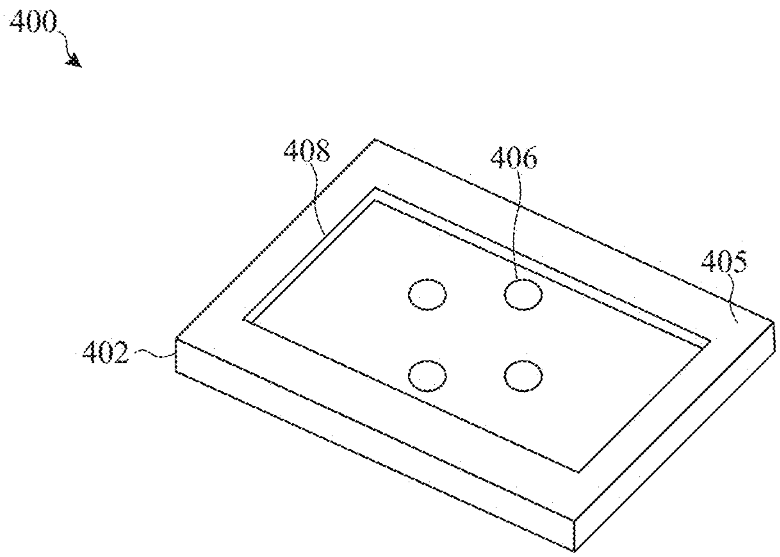
FIG. 4B shows a bottom-side perspective view of a wearable measurement accessory, as described herein.

FIG. 4B shows a bottom-side perspective view of the wearable measurement accessory 400, as described herein. The wearable measurement accessory 400 can include a bottom surface 405 that defines one or more second alignment features 408 that align the measurement accessory 400 to a sample patch. The sample patch may include a specific shape or have structures for coupling to the measurement accessory 400. The second alignment features 408 may define a recess (or other surface structure) that corresponds to a shape and/or surface of the sample patch.

In some cases, the sample patch may include an adhesive material for coupling to the measurement accessory 400. The second alignment feature(s) 408 may help guide the placement of the sample patch on the measurement accessory 400 and once placed on the measurement accessory 400, the adhesive may secure the sample patch in place. In other cases, the measurement accessory 400 can include an adhesive material for coupling to a sample patch.

Figure 5A:
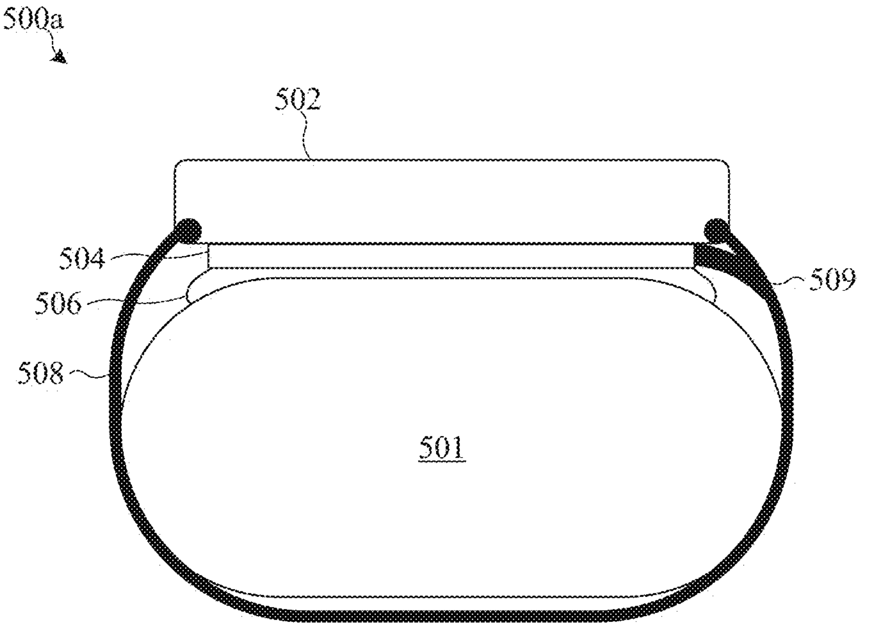
FIG. 5A shows a side view of an example wearable sample measurement system, as described herein.

FIG. 5A shows a side view of an example wearable sample measurement system 500*a*, as described herein. The wearable measurement system 500*a* can include a smartwatch 502, which may be an example of the smartwatches described herein, a wearable measurement accessory 504 which may be an example of the wearable measurement accessories described herein; and a sample patch 506, which may be an example of the sample patches described herein.

The smartwatch 502 can be couped to a user 501 by a band 508, which may extend at least partially around a portion of a user's body. In some cases, the wearable measurement accessory 504 may be coupled to the band 508. For example, a coupling strap 509 may couple the measurement accessory 504 to the band 508. In some cases, the coupling strap 509 may be coupled to (or extend from) an end of the measurement accessory 504.

The band 508, the coupling strap 509 and/or the measurement accessory 504 may be a contiguous structure (e.g., formed from a same material) and the coupling strap 509 may align the measurement accessory 504 to the smartwatch 502 (e.g., an optical sensing assembly on the smartwatch, as describe herein). For example, the coupling strap 509 may limit movement of the measurement accessory 504 with respect to the smartwatch 502. In some cases, the band 508, the coupling strap 509 and/or the measurement accessory 504 may be formed from one or more flexible materials, which may allow them to conform to the user 501, the smartwatch 502 and/or the sampling patch 506.

Figure 5B:
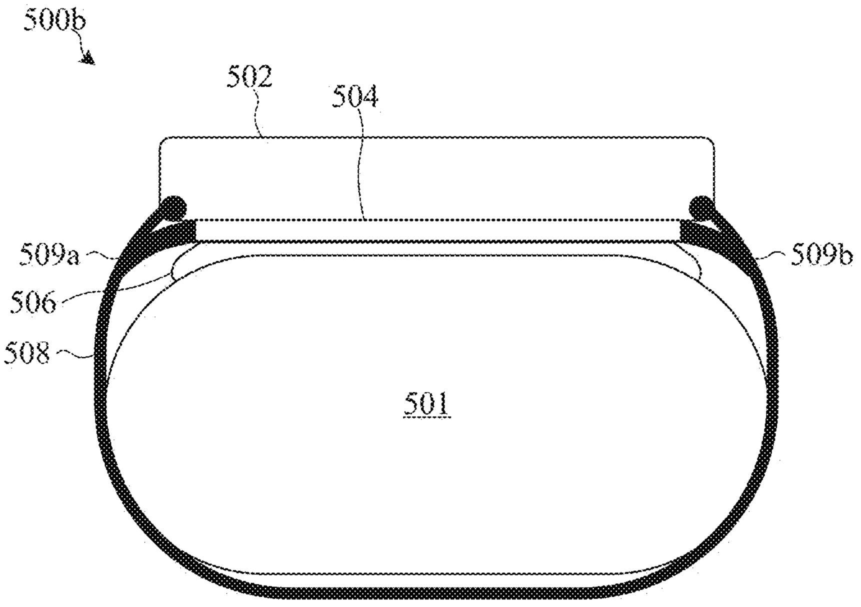
FIG. 5B shows a side view of an example wearable sample measurement system, as described herein.

FIG. 5B shows a side view of an example wearable sample measurement system 500*b*, as described herein. The example of the wearable measurement system 500*b* shown in FIG. 5B, includes a first coupling strap 509*a* that couples a first portion of the measurement accessory 504 to a first portion of the band 508, and a second coupling strap 509*b* that couples a second portion of the measurement accessory to a second portion of the band 508.

The band 508, the coupling straps 509*a* and 509*b* and/or the measurement accessory 504 may be a contiguous structure (e.g., formed from a same material) and the coupling straps 509*a* and 509*b* may align the measurement accessory 504 to the smartwatch 502 (e.g., an optical sensing assembly on the smartwatch, as describe herein). For example, the coupling straps 509*a* and 509*b* may limit movement of the measurement accessory 504 with respect to the smartwatch 502. In some cases, the band 508, the coupling straps 509*a* and 509*b* and/or the measurement accessory 504 may be formed from one or more flexible materials, which may allow them to conform to the user 501, the smartwatch 502 and/or the sampling patch 506.

Figure 6:
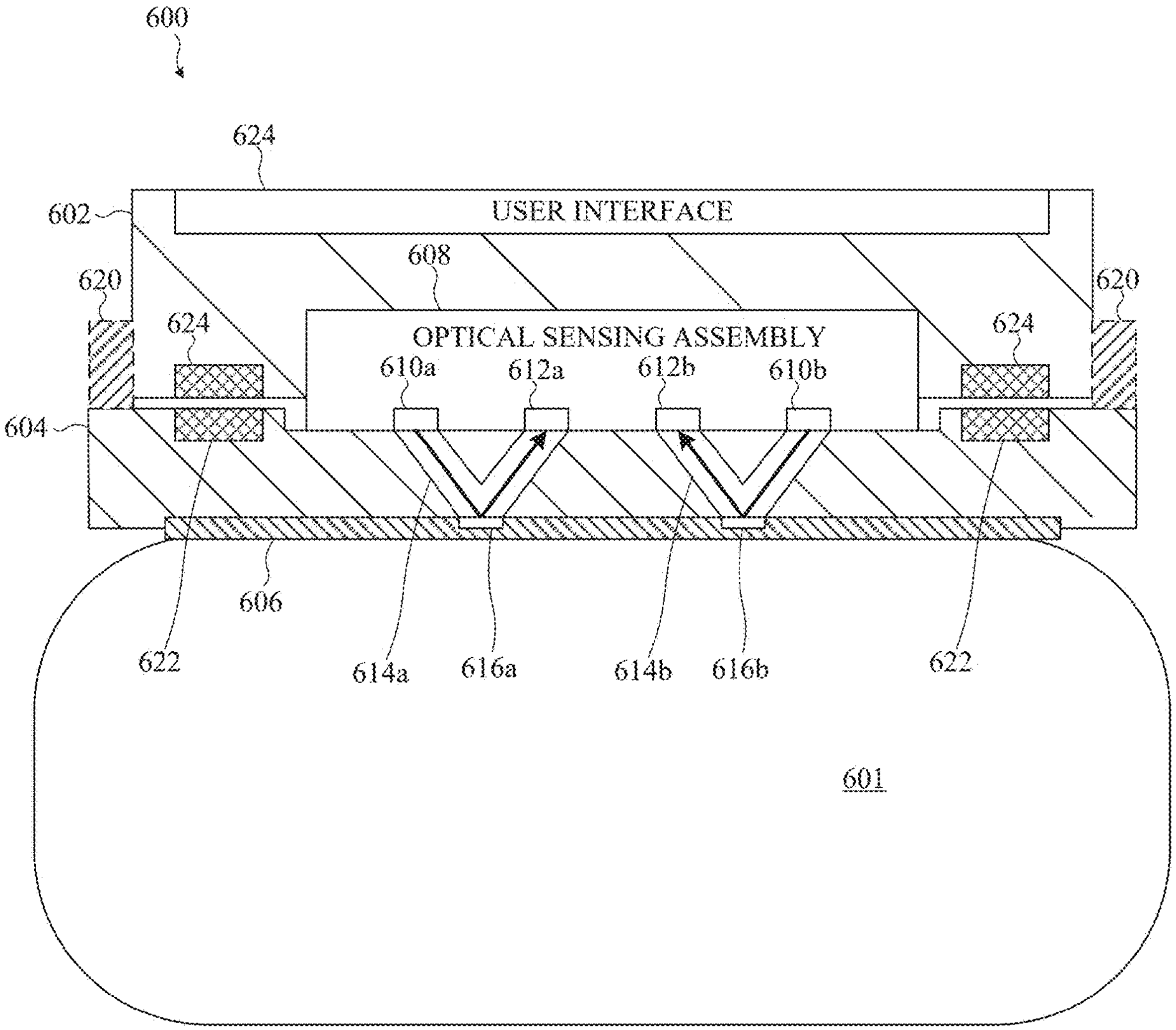
FIG. 6 shows a cross-sectional view of an example wearable sample measurement system, as described herein.

FIG. 6 shows a cross-sectional view of an example wearable sample measurement 600 system being worn by a user 601, as described herein. The wearable sample measurement system 600 can include a smartwatch 602, which can be an example of the smartwatches described herein; a wearable measurement accessory 604, which can be an example of the wearable measurement accessories described herein, and a sample patch 606, which can be an example of the sample patches described herein.

The smartwatch 602 can include an optical sensing assembly 608 that can include one or more light emitters 610 and one or more photodetectors 612. The light emitters 610 can be configured to emit light through transparent region of the optical sensing assembly 608 and the photodetectors 612 can be configured to detect light through the transparent region. In some cases, different ones of the light emitters 610 and/or the photodetectors 612 can be optically shielded from each other. For example, the optical sensing assembly may include non-transparent regions that prevent light from traveling directly from an emitter 610 to other emitters 610 and/or other photodetectors 612 (e.g., without first being emitted from the optical sensing assembly 608).

The wearable measurement accessory 604 can include one or more optical channels 614 that extend between an optical sensing assembly 608 and the sample patch 606. The optical channels 614 can define one or more illumination paths between one or more light emitters 610, the sample patch 606 and one or more photodetectors 612. The sample patch 606 can define one or more sampling regions 616 and the optical channels 614 can direct light to the sampling region(s) 616.

For example, the wearable measurement accessory 604 can include a first optical path 614*a* and light emitted from a first light emitter 610*a* may travel along the first optical path 614*a* and to a first sampling region 616*a*. Emitted light may travel from the first sampling region 616*a* and along the first optical path 614*a* to a first photodetector 412*a*.

The wearable measurement accessory 604 can include a second optical path 614*b* and light emitted from a second light emitter 608*b* may travel along the second optical path 614*b* and to a second sampling region 616*b*. Emitted light may travel from the second sampling region 616*b* and along the second optical path 614*b* to a second photodetector 612*b*. Accordingly, in some cases different optical paths can be associated with particular sampling regions 611.

The sample patch 606 can contact a user 601 and change one or more properties in response to biologicals substance produced by the user. The wearable measurement system 600 may allow continuous or intermittent monitoring of substance while the system is worn. In some cases, the sample patch 606 can be configured to change properties in response to biological materials in sweat, blood, interstitial fluid, and/or other substance produced at or near a skin surface.

In some cases, the different sampling regions 616 may perform different functions. For example, the first sampling region 616*a* can be associated with a control region and the second sampling region 616*b* can be associated with a test region. In other cases, different sampling regions can be associated with different reactants, test for different substances, and so on. The wearable measurement accessory 604 can include additional optical paths that are associated with particular sampling regions 616 on the sample patch 108.

In other cases, the wearable measurement accessory 604 can include one or more light sources and/or optics that can emit, direct and/or otherwise modify light that is transmitted to and/or from a sampling region.

The wearable measurement accessory 604 can include one or more alignment features that define an orientation of the wearable measurement accessory 604 (and sample patch 606) to the smartwatch 602. For example, the wearable measurement accessory 604 can include alignment features 620 that contact the housing of the smartwatch 602 to orient the wearable measurement accessory 604 with respect to the smartwatch 602. These alignment features 620 may be defined by a housing of the measurement accessory and may define a surface(s) that contacts specific surfaces of the smartwatch such as a curved cover of the optical sensing assembly 608, back surface, sides surfaces, and/or front surfaces of the smartwatch 602 housing, and so on.

In some cases, the wearable measurement accessory 604 may include first magnetic structures 622 that helps align and/or couple the measurement accessory 604 to the smartwatch 602. Additionally or alternatively, the smartwatch 602 may include second magnetic structures 624 that help align and couple the measurement accessory 604 to the smartwatch 602. The magnetic structures 622, 624 may include any suitable materials and/or components that create a magnetic attraction between the first magnetic structures 622 and the second magnetic structures 624.

Figure 7:
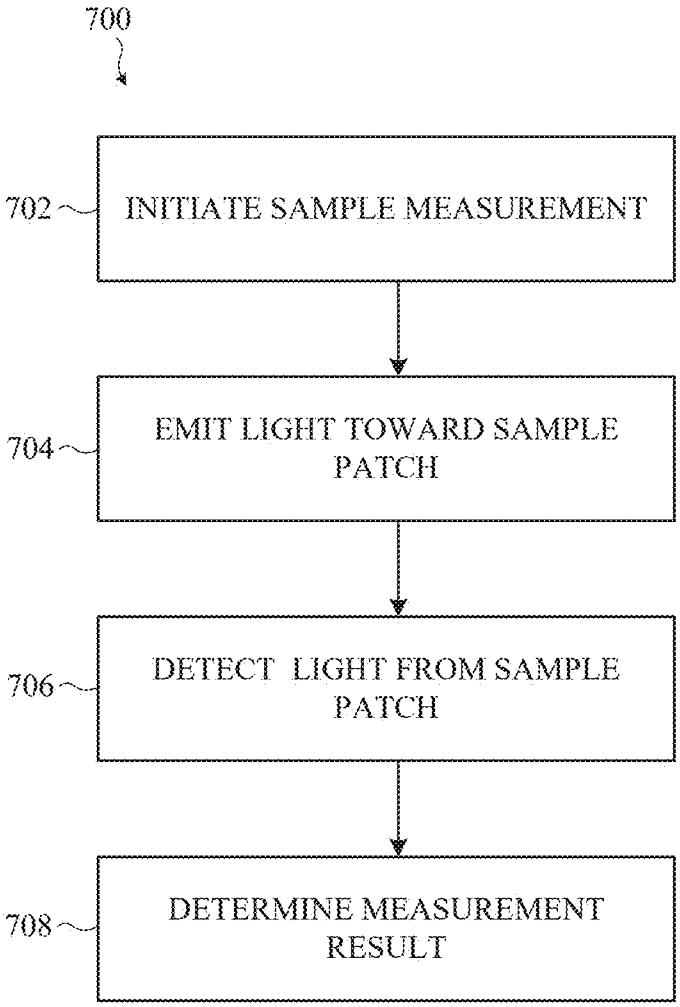
FIG. 7. shows an example process for performing a test using the sample testing systems, as described herein.

FIG. 7. shows an example process for performing a test using the sample testing systems, as described herein (e.g., the measurement systems described with reference to FIGS. 1-6).

At operation 702, the process 700 can include initiating a measurement test. A measurement test can be initiated in a variety of ways. In some cases, the smartwatch may be used to initiate a test. For example, the user smartwatch may include an application that controls a measurement test, provides instructions to the user for performing a measurement test, provides updates on various processes associated with a measurement test, provides results to a user and/or provides other outputs (e.g., alerts, haptic outputs and so on). In other cases, a test may be scheduled, and the app may prompt a user to perform a test in response to scheduling criteria be satisfied. In further example, the smartwatch may monitor/analyze one or more user parameters, such as cardiac activity (e.g., heart rate), an activity level of the user, temperature data, location data (e.g., determining a user's proximity to other individuals that have confirmed an infection), and so on. An application may prompt a user to perform a test based on one or more of these monitored parameters satisfying a criteria.

Additionally or alternatively, a measurement test may be initiated based a sample patch being coupled to a measurement accessory. In some cases, the sample patch can include wireless communication circuitry that communicates with the smartwatch and/or measurement accessory. For example, the sample patch may include RFID circuitry, NFC circuitry, and/or any other suitable wireless communication circuitry. The wireless circuitry on the sample patch may communicate information about the type of test that is being performed. The smartwatch and/or measurement accessory may use this information to identify and perform a test protocol. For example, the test protocol may indicate parameters for emitting light toward the sample and/or detecting light from the sample, detection times, the spatial arrangement of the sample patch (e.g., the location of a sample, control region and so on with respect to the optical sensing system).

Additionally or alternatively, the sample patch may use wireless circuitry to communicate an identifier for a particular test (e.g., a serial number), which may be used to associate the test and/or test results with other parameters such as a date and time of the test, user identification, user parameters measured by other sensors (e.g., a heart rate and/or other physiological information), and so on. In some cases, the sample patch may use the wireless circuitry to communicate whether a particular test has expired and/or is otherwise not suitable for performing a measurement test. In some cases, coupling of the sample patch to the measurement accessory may be detected and used to initiate a measurement test.

In other cases, a user may use an application to identify a test, select a testing protocol and/or enter other information about a particular test. For example, in response to initiating a measurement test through an application, the application may prompt the user to provide information related to the test such as other physiological parameters (e.g., symptoms experienced by the user, last time the user ate, and so on).

In some cases, the measurement accessory and/or smartwatch may perform procedures to help ensure that the testing protocol is performed correctly. For example, the measurement accessory and/or smartwatch may determine if the sample patch is positioned correctly. In some cases, the measurement accessory may include sensors that determine if the sample patch is properly engaged. Additionally or alternatively, the smartwatch may operate optical sensor(s) to determine if the sample patch is properly engaged with the measurement accessory, which may include analyzing a control feature on the sample patch, where the control feature provides a particular output if positioned correctly and provides a different output if not positioned correctly.

At operation 704, the process 700 can include emitting light toward the sample patch. In some cases, the light can be emitted from the optical sensing assembly on the smartwatch. Additionally or alternatively, light can be emitted from one or more light sources on the measurement accessory. The parameters for emitting light may be specified by a measurement protocol. The parameters can include specific light sources that emit one or more defined wavelengths of light, duration of exposure, coordination of different emitters (e.g., operating different color light sources at different times), intensity, and so on. For example, the measurement protocol may cause the smartwatch to emit a first wavelength (e.g., IR light) at a first time and a second wavelength (e.g., green light) at a second time. Accordingly, the photodetector may detect returned portions of the first wavelength during the first time and associate these measurements with the first wavelength. The photodetector may detect returned portions of the second wavelength during the second time and associated these measurements with the second wavelength. The smartwatch may include additional light sources and may coordinate emissions timing to isolate and/or overlap different wavelengths of light which are specified by a given measurement protocol.

The measurement accessory may include one or more light sources which may be used in addition to or as an alternative to light emitters on the smartwatch. The measurement accessory may include lights sources that emit different wavelengths or ranges of wavelength than the light emitters on the smartwatch. For example, the measurement accessory may include a broad band light source which may be used to illuminate a sample patch for a particular measurement test that requires a broadband light source. The measurement accessory may include a narrow band light source that causes fluorescence of particular substances used in a measurement test. Accordingly, in some cases, light sources contained in a measurement accessory may be configured for a particular type(s) of measurement tests.

At operation 706, the process 700 can include detecting light from the sample patch. Light returned from the sample patch can be detected by one or more photodetectors of the smartwatch. The returned light may include light that has been reflected, refracted, traveled through one or more components on the sample patch, interacted with components on the sample patch (e.g., a sample, reactants on the sample patch, and so on) or otherwise been directed to the photodetectors as part of a measurement procedure.

At operation 708, the process 700 can include determining a measurement result using the emitted and/or detected light. In some cases, a measurement test may be configured to give a binary result of whether a condition/substance is present or not. For example, the sample patch may include a color changing reactant that changes to a particular color if a particular substance is present. The smartwatch may be configured to analyze detected light to determine if the particular color is present. In response to determining that the particular color is present the smartwatch may output a positive test result and in response to determining the particular color is not present, the smartwatch may output a negative result.

In other cases, the smartwatch can be configured to determine an outcome based on a particular measurement test and measurement protocol associated with the measurement test. For example, a measurement test may include a color-based output, where a reaction with a sample creates a color change based on whether a condition and/or substance is present. The smartwatch can detect the color change to determine a result. Additionally or alternatively, the amount/intensity of the color change, a particular color, a color gradient may be associated with a concentration of a biological substance. In these cases, the smartwatch may determine a concentration from detecting a change in color intensity, a change of a reactant to a particular color, a color gradient, and so on. In other examples, the presence of a particular substance in a sample may cause a reactant to fluoresce. The smartwatch can be configured to detect the fluorescence to determine a measurement result.

Additionally or alternatively, a measurement test may include different active regions that provide information that can be detected by the smartwatch. For example, a first active region may be configured to detect a first substance in a sample, a second active region may be configured to detect a second substance in the sample, and a third active region may comprise a control region. The smartwatch may use a spatial arrangement of different detectors and emitter to analyze each of the regions. For example, a first set of light emitter(s) and photodetector(s) may be used to emit and detect light from the first active region, a second set of light emitter(s) and photodetector(s) may be used to emit and detect light from the second active region and a third set of light emitter(s) and photodetector(s) may be used to emit and detect light from the third active region.

The smartwatch can be configured to output results of a measurement test to a user. The results may include visual outputs, audio outputs, haptic outputs and/or other suitable types of outputs. The results may include an indication of whether a condition/substance is present (e.g., a binary result such as a positive or a negative result), a quantitative indication (e.g., a concentration of a substance), or other suitable output. In some cases, the measurement test may track a substance over time and the output may indicate the change in the substance over time.

In some cases, the smartwatch can be configured to provide information about a result. For example, if the measurement test determines the concentration of a substance (e.g., an analyte concentration), the smartwatch may provide information that indicates whether the concentration falls within a normal range, an elevated range or a low range for the substance.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining spatial parameters, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, haptic outputs may be provided based on non-personal information data or a bare minimum amount of personal information, such as events or states at the device associated with a user, other non-personal information, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A measurement accessory for use with a smartwatch, the measurement accessory comprising:
- a flexible strap comprising:
  - a top surface configured to align the flexible strap with an optical sensor of the smartwatch;
  - a bottom surface configured to align a sample patch with the optical sensor of the smartwatch;
  - a first optical path between the top surface of the flexible strap and the bottom surface; and
  - a second optical path between the top surface of the flexible strap and the bottom surface, wherein when the smartwatch is coupled to the flexible strap:
  - the first optical path is configured to:
    - allow light emitted by the smartwatch to reach the sample patch; and
    - allow light reflected from the sample patch to reach the smartwatch;
  - the first optical path allows light emitted from a first emitter on the smartwatch to reach a first portion of the sample patch that corresponds to a control region on the sample patch; and
  - the second optical path allows light emitted from a second emitter on the smartwatch to reach a second portion of the sample patch that corresponds to an active region of the sample patch.

2. The measurement accessory of claim 1, wherein the flexible strap positions the sample patch against a skin surface of a user when the smartwatch is worn by the user.

3. The measurement accessory of claim 1, wherein the flexible strap is configured to couple to a band of the smartwatch and align the top surface of the flexible strap with the optical sensor of the smartwatch.

4. The measurement accessory of claim 1, wherein:
 a first end of the flexible strap is configured to couple to first portion of a band of the smartwatch;
 a second end of flexible strap is configured to couple to a second portion of the band; and
 extend across the optical sensor.

5. The measurement accessory of claim 1, wherein the flexible strap optically isolates light traveling along the first optical path from light traveling along the second optical path.

6. A wearable system for performing sample measurements, the wearable system comprising:
 a smartwatch comprising a housing and an optical sensing assembly positioned at least partially within the housing;
 a sample patch configured to contact a user; and
 a measurement accessory defining a first optical path and a second optical path, the measurement accessory configured to:
  be positioned between the smartwatch and the sample patch when the smartwatch is worn by the user; and
  align the first optical path and the second optical path with the optical sensing assembly on the smartwatch when the smartwatch is worn by the user, the first optical path and the second optical path extending between the optical sensing assembly and the sample patch;
 wherein:
  the measurement accessory optically isolates light traveling along the first optical path from light traveling along the second optical path; and
  the smartwatch is configured to:
   emit light towards the sample patch via the first optical path;
   detect a portion of the emitted light returned from the sample patch via the first optical path; and
   determine a measurement result using the light returned from the sample patch.

7. The wearable system of claim 6, wherein:
 the optical sensing assembly comprises a transparent window defining a curved outer surface;
 the measurement accessory comprises a flexible strap that conforms to the curved outer surface of the transparent window; and
 the flexible strap defines the first optical path and the second optical path.

8. The wearable system of claim 7, further comprising a band that is configured to wrap at least partially around a limb of the user and secure the smartwatch to the user, wherein the flexible strap couples to the band.

9. The wearable system of claim 7, wherein:
 the flexible strap defines a band that is configured to wrap at least partially around a limb of the user and secure the smartwatch to the user; and
 the flexible strap comprises an end that extends between the transparent window and the user when the smartwatch is worn by the user.

10. The wearable system of claim 6, wherein:
 the first optical path corresponds to an active region of the sample patch; and
 the second optical path corresponds to a control region of the sample patch.

11. The wearable system of claim 6, wherein:
 the smartwatch comprises one or more electrodes that are configured to conductively couple to the sample patch when the sample patch is coupled to the measurement accessory; and
 the smartwatch is configured to measure one or more electrical properties of a sample applied to the measurement accessory using the one or more electrodes.

12. The wearable system of claim 6, wherein the measurement accessory comprises a lens positioned within the first optical path, a filter positioned within the first optical path, or a combination thereof.

13. The wearable system of claim 12, wherein the filter comprises a gel-based material that is configured to amplify a light signal received from the sample patch.

14. The wearable system of claim 6, wherein the measurement accessory comprises a light source that is configured to emit light toward the sample patch.

15. A method for determining a measurement result using a smartwatch, the method comprising:
 determining, by the smartwatch, that a sample patch is positioned between the smartwatch and a user;
 in response to detecting the sample patch positioned between the smartwatch and the user:
  emitting first light from a first emitter of an optical sensing assembly of the smartwatch and toward a first location on the sample patch;
  detecting a portion of the first light returned from the first location on the sample patch;
  emitting second light from a second emitter of the optical sensing assembly of the smartwatch and toward a second location on the sample patch;
  detecting a portion of the second light returned from the second location on the sample patch; and
  determining the measurement result based on the detected portion of the first light and the detected portion of the second light, wherein:
  the first light is emitted during a first time period; and
  the second light is emitted during a second time period.

16. The method of claim 15, wherein:
 the first location corresponds to a control region of the sample patch;
 the second location correspond to a sample region of the sample patch; and
 determining the measurement result comprises associating the detected portion of the first light with the control region and associating the detected portion of the second light with the sample region.

17. The method of claim 15, wherein:
 the portion of the first light is detected using a first detector; and
 the portion of the second light is detected using a second detector.

18. A method for determining a measurement result using a smartwatch, the method comprising:
 determining, by the smartwatch, that a sample patch is positioned between the smartwatch and a user;
 in response to detecting the sample patch positioned between the smartwatch and the user:
  emitting first light from a first emitter of an optical sensing assembly of the smartwatch and toward a first location on the sample patch;
  detecting a portion of the first light returned from the first location on the sample patch;
  emitting second light from a second emitter of the optical sensing assembly of the smartwatch and toward a second location on the sample patch;

detecting a portion of the second light returned from the second location on the sample patch; and determining the measurement result based on the detected portion of the first light and the detected portion of the second light, wherein:

the first location corresponds to a control region of the sample patch;

the second location correspond to a sample region of the sample patch; and determining the measurement result comprises associating the detected portion of the first light with the control region and associating the detected portion of the second light with the sample region.

19. The method of claim 18, wherein:

the portion of the first light is detected using a first detector; and the portion of the second light is detected using a second detector.

* * * * *